(12) United States Patent
Ryu

(10) Patent No.: US 7,058,659 B2
(45) Date of Patent: Jun. 6, 2006

(54) APPARATUS AND METHOD FOR FILE MANAGEMENT OF PORTABLE DEVICE

(75) Inventor: Ho-yong Ryu, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 264 days.

(21) Appl. No.: 10/125,514

(22) Filed: Apr. 19, 2002

(65) Prior Publication Data

US 2003/0018610 A1 Jan. 23, 2003

(30) Foreign Application Priority Data

Jul. 19, 2001 (KR) ............... 2001-43588

(51) Int. Cl.
*G06F 7/00* (2006.01)
*G06F 12/00* (2006.01)
(52) U.S. Cl. ............... 707/104.1; 707/102; 711/115
(58) Field of Classification Search ............... 707/102; 710/28; 725/93
See application file for complete search history.

(56) References Cited

U.S. PATENT DOCUMENTS 5,508,733 A * 4/1996 Kassatly .......... 725/93
5,598,575 A * 1/1997 Dent et al. .......... 710/28
6,167,404 A * 12/2000 Morcos et al. .......... 707/102

OTHER PUBLICATIONS

J. Singer, "KChmod", LEETA, Online, Apr. 24, 2001, XP002305274, Retrieved from the Internet: URL: www.leeta.net, pp. 2.
J Singer, "Kchmod.h", Header File of Source Code, Online, Nov. 1, 2000, XP002305275, Retrieved from the Internet: URL: linux.tucows.com/preview/57270.html, retrieved Nov. 12, 2004, pp. 2.
A. Vance et al., "DataPlay Shows Breakthrough In Storage Media", PC World, A.PC World Communications, Inc., San Francisco, US, Jan. 9, 2001, pp. 1-3, XP002276162, ISSN: 0737-8939.

(Continued)

*Primary Examiner*—Uyen Le
*Assistant Examiner*—Susan Y Chen
(74) *Attorney, Agent, or Firm*—Staas & Halsey LLP

(57) ABSTRACT

A method and an apparatus for managing a vast amount of file in a portable device. The file management apparatus of the portable device includes a disk engine which reads attribute information of a file recorded in a recording medium, an input unit which inputs a command for editing the stored attribute information, a controller which controls the portable device to record/reproduce the file corresponding to the read attribute information, and a display unit which displays the attribute information to allow an user to edit the attribute information. The attribute of the file recorded in the recording medium can be edited by an editing command, and each file is processed in accordance with the attribute information. Accordingly, the user can easily manage the vast amount of information.

8 Claims, 4 Drawing Sheets

OTHER PUBLICATIONS

Mayank Sarup, "Understanding Linux File Permissions", freeos.com, Online, Jan. 5, 2001, XP002305282, Retrieved from the Internet: pp. 5, URL: http://ww.freeos.com/articles/3127, retrieved on Nov. 12, 2004.

European Search Report, issued Dec. 1, 2004 with respect to corresponding European Patent Application No. 02253845.8, filed May 31, 2002.

* cited by examiner

APPARATUS AND METHOD FOR FILE MANAGEMENT OF PORTABLE DEVICE

CROSS-REFERENCE TO RELATED APPLICATIONS

This application claims the benefit of Korean Application No. 2001-43588, filed Jul. 19, 2001, in the Korean Industrial Property Office, the disclosure of which is incorporated herein by reference.

BACKGROUND OF THE INVENTION

1. Field of the Invention

The present invention relates to an apparatus and a method of managing an attribute of directories and files recorded in a recording medium, and more particularly, to an apparatus and a method of managing an attribute of directories and files recorded in a vast capacity recording medium.

2. Description of the Related Art

Useful devices capable of reproducing and storing information regardless of a time and a place have been broadly popularized with the development of modern technologies. Among these devices is a recording medium such as a magnetic tape, a floppy disk and a compact disk, and an apparatus using the recording medium (referred to a 'system' hereinbelow). The recording medium can have a vast storage capacity due to the development of a digital technology. The system can also be more compact with a higher speed. Therefore, a user is able to obtain and store a vast amount of information with the development of the recording medium and the system, and the popularization of the Internet.

Recently, a recording medium such as a digital convergence disk (DCD) having a capacity of 500 mega bites for a small disk of 32 mm and a device which drives the recording medium have been developed. Accordingly, a user is allowed to obtain and store a vast amount of information.

However, a method is needed to easily manage the information recorded on the recording medium. There is also a need to develop a method which allows a restricted access to the information based on user characteristics.

SUMMARY OF THE INVENTION

Accordingly, it is an object of the present invention to provide a file management apparatus for a portable device and a file management method capable of managing each file according to an attribute of the file recorded in a recoding medium.

Additional objects and advantages of the invention will be set forth in part in the description which follows and, in part, will be obvious from the description, or may be learned by practice of the invention.

To achieve the above and other objects of the present invention, there is provided a file management apparatus for a portable device including a disk engine which reads attribute information of a file recorded in a recording medium and a controller which controls the portable device to record/reproduce the file corresponding to the read attribute information.

The file management apparatus further comprises an input unit having a key which edits the recorded attribute information. The controller updates the attribute information recorded in the recording medium by editing the attribute information of the file in accordance with an input edit command.

Moreover, the file management apparatus further comprises a memory which receives the attribute information from the recording medium and stores the attribute information, and a display unit which displays the attribute information stored in the memory to allow a user to edit the attribute information.

In addition, the controller displays the edited attribute information on the display unit where at least one attribute information among the stored attribute information in the memory is edited by the input unit.

Furthermore, where the read attribute information of the file is set up as unable to write, the controller displays a message asking whether to convert the read attribute information of the file to writable attribute information in response to a writing command key signal, and processes the file corresponding to a replied signal regarding the conversion from the input unit.

To achieve the above and other objects of the present invention, there is also provided a method of managing a file for a portable device comprising reading attribute information of the file recorded in a recording medium and controlling the portable device to record/reproduce the file corresponding to the read attribute information.

The method of managing the file further includes receiving a edit command to edit the recorded attribute information and updating the attribute information recorded in the recording medium by editing the attribute information of the file in accordance with the edit command.

Moreover, the method of managing the file may further include storing the read attribute information from the recording medium in a memory and displaying the attribute information stored in the memory to allow a user to edit the attribute information.

In addition, the method of managing the file may further include displaying the edited attribute information on a display unit where at least one attribute information among the stored attribute information in the memory is edited by the input unit.

Furthermore, the method of managing the file may include displaying a message asking whether to convert the attribute information of the file to writable attribute information in response to a writing command key signal which is transmitted where the read attribute information of the file is set up as unable to write, and processing the file corresponding to a replied signal regarding the conversion from an input unit.

Accordingly, a user can manage the vast amount of information that he/she has recorded in a recording medium in accordance with attribute information of each of the files recorded in the recording medium.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
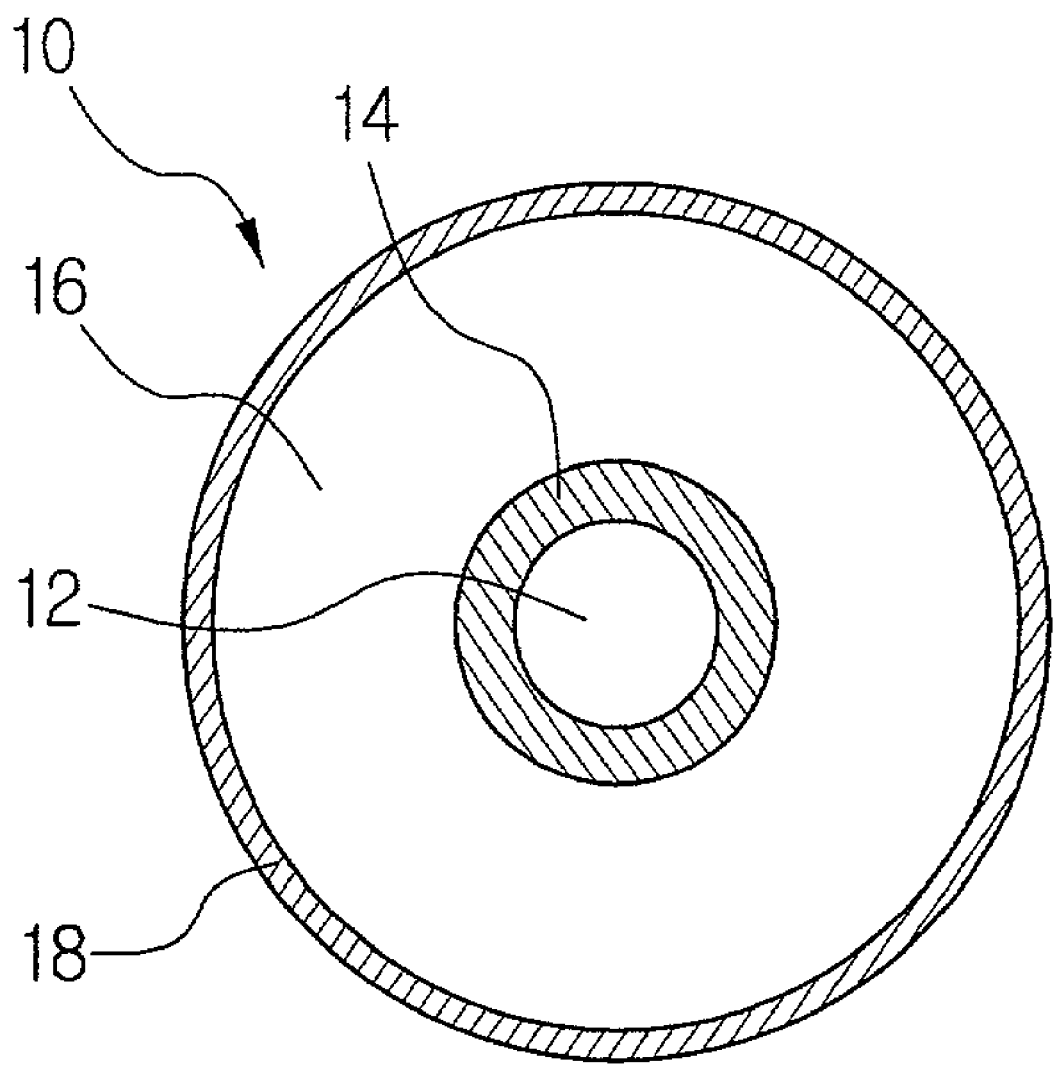
FIG. 1 is a plan view showing one side of a DCD capable of recording on both sides.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows one side of a DCD 10 capable of recording on both sides by dividing it into recording areas. The DCD 10 is a circular plate and includes a hole 12, a peculiar number recording area 14, a data recording area 16, and a file system recording area 18.

The hole 12 is formed at the center of the DCD 10, and buffers a shaking of the DCD 10 while the DCD 10 is rotated. The peculiar number recording area 14 is a ring type area formed in a predetermined area around the hole 12. The peculiar number recording area 14 has a recorded peculiar number which is assigned to each DCD 10 to identify the DCD 10. Moreover, the peculiar number recording area 14 includes information which identifies one side from the other side of the DCD 10 according to a characteristic of the DCD 10.

The data recording area 16 receives files including music data, document data and image data, and occupies most of the capacity of the DCD 10. The file system recording area 18 is a ring-type area formed at the farthest part from the center of the DCD 10, and has information of the files recorded in the data recording area 16. The information includes file system information and directory information. The file system information includes the size of the file, the name of the file, the recording date and time of the file, the type of the file, directory information of the recorded data, and the last update date and time of the file with respect to the files recorded in the data recoding area 16. The directory information includes information of an area which stores the files related to each other after grouping of the files as one group. Other files that are not related, for example, to the one group are stored into another directory so as to catalog and not mix the files.

Figure 2:
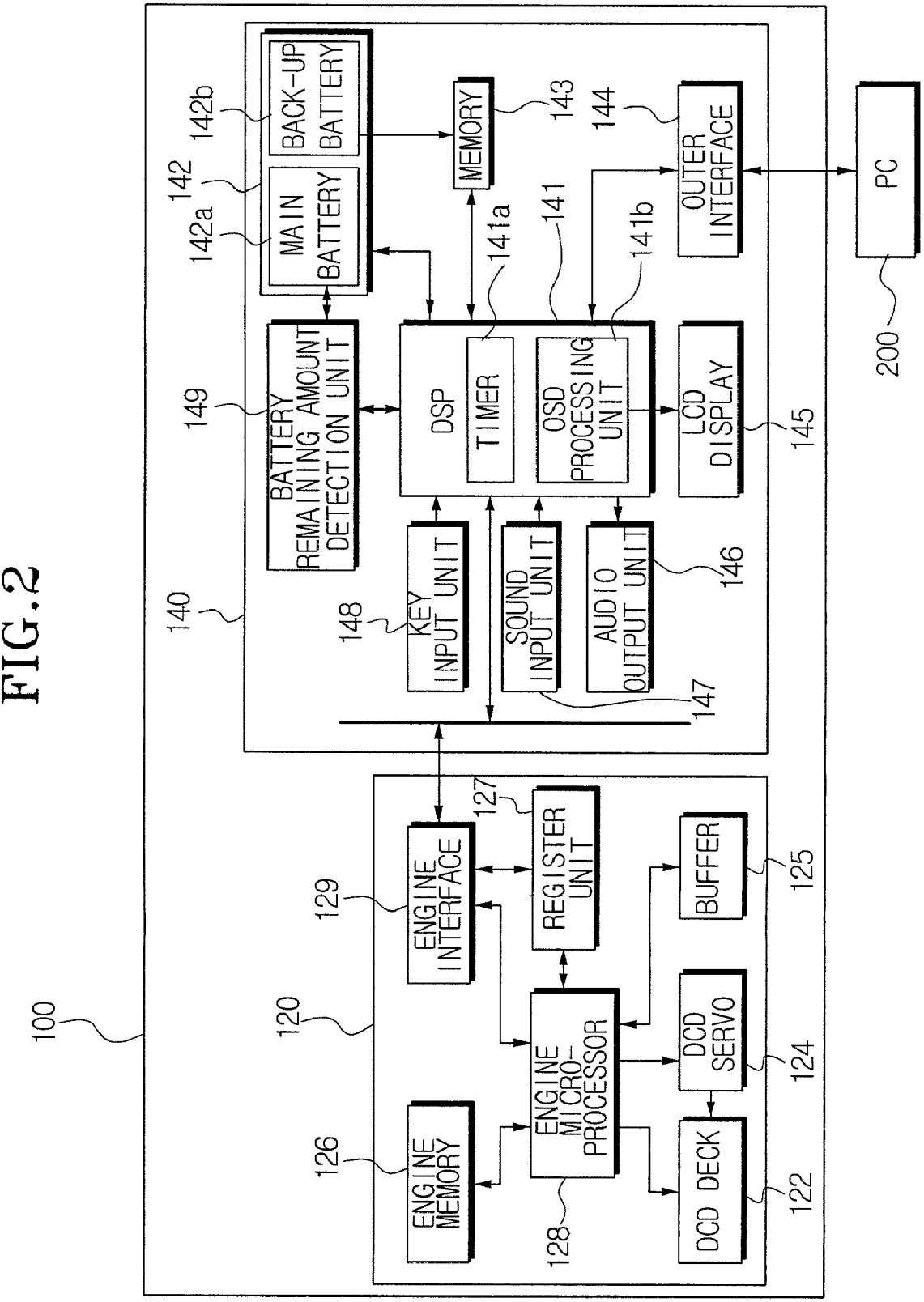
FIG. 2 is a block diagram schematically showing a structure of a digital device which records/reproduces data on/from the DCD according to an embodiment of the present invention.

FIG. 2 shows a block diagram schematically illustrating the structure of a digital device 100 for recording data on the DCD 10 or reproducing the data recorded on the DCD 10. The digital device 100 for DCD 10 includes an engine unit 120 and a host 140.

The engine unit 120 is a DCD driver which records data and reads the data with respect to the DCD 10. The host 140 is connected with the engine unit 120 and controls the engine unit 120. The host 140 can control the engine unit 120 by being connected, for example, with an outer apparatus such as a personal computer 200.

The engine unit 120 includes a DCD deck unit 122, a DCD servo 124, a buffer 125, an engine memory 126, an engine microprocessor 128, and an engine interface 129. The DCD deck unit 122 records or reproduces the data with respect to the DCD 10 where the DCD 10 is inserted into the engine unit 120 in accordance with a control of the engine microprocessor 128. The DCD servo 124 drives the DCD deck 122 in accordance with a control of the engine microprocessor 128. The buffer 125 temporarily stores the data to be recorded and reproduced where the data is recorded and reproduced with respect to the DCD 10. SRAM, for example, can be used as the buffer 125. The engine memory 126 stores control data and code values of various command words that are determined between the DCD 10 and the engine unit 120, and between the engine unit 120 and the host 140. A flash memory, for example, can be used as the engine memory 126. The engine microprocessor 128 controls the DCD deck unit 122, the DCD servo 124, and the buffer 125. The engine interface 129 provides an interface between the engine unit 120 and the host 140.

The host 140 includes a digital signal processor DSP 141, a power supply unit 142, a memory 143, an outer interface 144, a LCD display 145, an audio output unit 146, a sound input unit 147, a key input unit 148, and a battery remaining amount detection unit 149.

The DSP 141 is connected with the engine interface 129, and records and reads the data by accessing the engine unit 120. The DSP 141 also controls the function of reproducing the read data and the entire digital device 100 for the DCD 10. Moreover, the DSP 141 controls the entire digital device 100 for the DCD 10 to reproduce/record the files according to attribute information of the data read by the engine unit 120.

The DSP 141 includes a timer 141a and an on screen display (OSD) processing unit 141b. The timer 141a provides time information which controls the digital device 100 for the DCD 10. The OSD processing unit 141b provides various letter information to be displayed on the LCD display 145.

The power supply unit 142 includes a main battery 142a and a back-up battery 142b. The main battery 142a provides power which drives the digital device 100 for the DCD 10. The back-up battery 142b provides power which returns the data that is remaining in the memory 143 after the power of the digital device 100 for the DCD 10 is cut off. The battery remaining amount detection unit 149 checks the remaining amount of the power of the main battery 142a and transmits the result to the DSP 141.

The memory 143 is controlled by the DSP 141, and stores attribute information after receiving the attribute information from the DCD 10. The attribute information stored into the memory 143 includes at least one attribute among hiding, writing, file name changing, file route, and deleting with respect to the files.

The outer interface 144 provides interface between the digital device 100 for the DCD 10 and the personal computer 200. The outer interface 144 uses, for example, a USB interface.

The LCD display 145 displays the attribute information stored in the memory 143 to allow a user to easily edit the attribute information. In addition, since the LCD display 145 displays the edited attribute information, where the one attribute among the hiding, the writing, the file name changing, the file route, and the deleting is edited by the user, the user can check the update of the attribute information.

The audio output unit 146 outputs audio data reproduced from the DCD 10 and also outputs various messages created at the DSP 141. The sound input unit 147 processes a sound command input from the user and transmits the sound command to the DSP 141. The user can also input a command to the digital device 100 for the DCD 10 through the key input unit 148. Here, the key input unit 148 and the sound input unit 147 are used to input a command to edit the attribute information recorded on the DCD 10.

Figure 3:
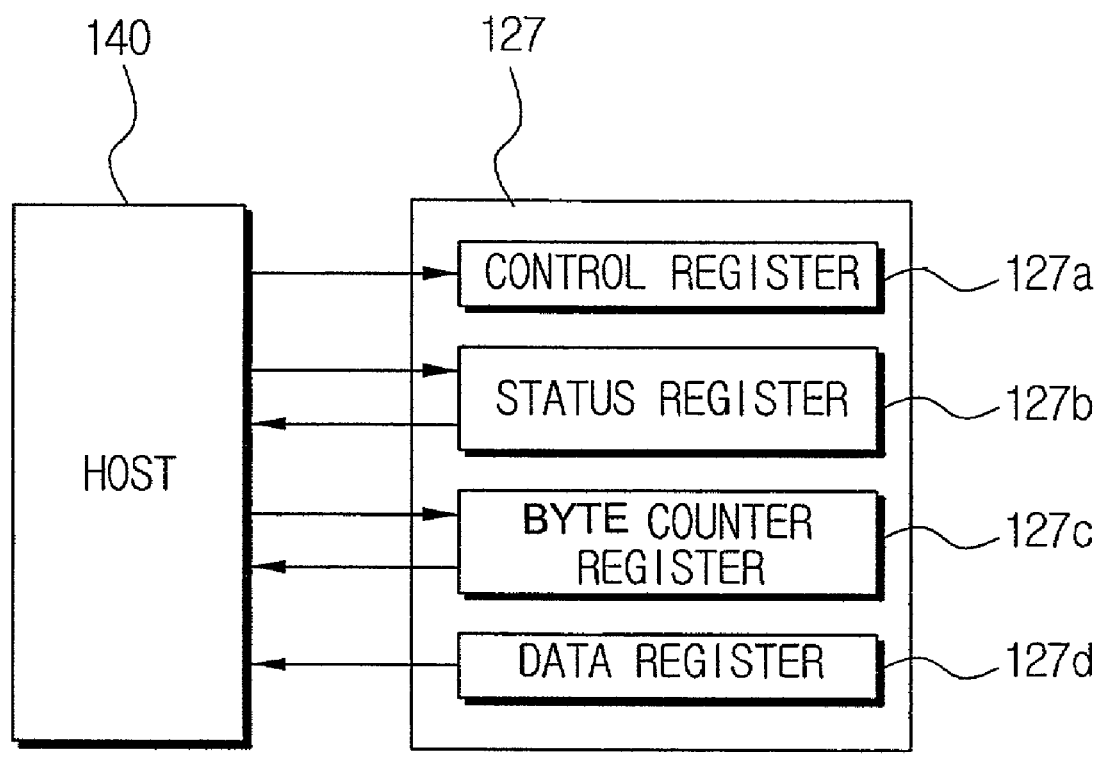
FIG. 3 is a block diagram showing data exchange between a host and registers, as applied to the digital device of FIG. 2.

FIG. 3 shows, with reference to FIG. 2, that the engine unit 120 also includes a register unit 127 comprising four registers. The register unit 127 comprises a control register 127a, a status register 127b, a byte counter register 127c and a data register 127d. Each of the registers is used to communicate with the host 140. The host 140 selects a register among the registers of the register unit 127 to access, in accordance with the value of two bits (DPI_ADD0 and DPI_ADD1) of an address bit, for the DCD interface. The host 140 performs a recording with respect to the control register 127a, and the engine 120 performs a reading.

The control register 127a controls the functions recorded by the host 140 and includes an interface interrupt enable value and an interface interrupt disable value. The host 140 can only read with respect to the status register 127b, and can read and record with respect to the engine unit 120. The status register 127b includes status information and interrupt reason information. The host 140 and the engine unit 120 can respectively perform a recording and reading with respect to the byte counter register 127c. Yet, the host 140 can record into the byte counter register 127c only when a busy byte of the status register 127b is clear, and reads return valid information from the byte counter register 127c only when a data byte of the status register 127b is set. The byte counter register 127c includes a byte count which transmits a next command, data, or a status mode. The host 140 and the engine unit 120 can read and record with respect to the data register 127d. Yet, the host 140 records the data into the data register 127d to transmit the data to the engine unit 120 during a command and a data output mode. Additionally, the host 140 reads the data register 127d to transmit the data from the engine unit 120 during a status and a data input mode.

As described above, the DCD 10 can be adopted, where the engine unit 120 is installed, regardless of the type of the digital device 100.

Four layers exist to provide a connection between the host 140 and the engine unit 120. The four layers are a physical layer which physically connects the host 140 and the engine unit 120, a data-link layer which defines a method of exchanging the information between the host 140 and the engine unit 120, a command layer which records the commands related to the data with respect to the DCD 10 in order to control the data accessed from the engine unit 120, and an application layer which includes mapping of the file data/meta data and a user interface. The connection status of the four layers existing between the host 140 and the engine unit 120 can allow the file data/meta data recorded on the DCD 10 and driven by the engine unit 120 to be transmitted to the host 140 and be processed without any difficulties.

Figure 4:
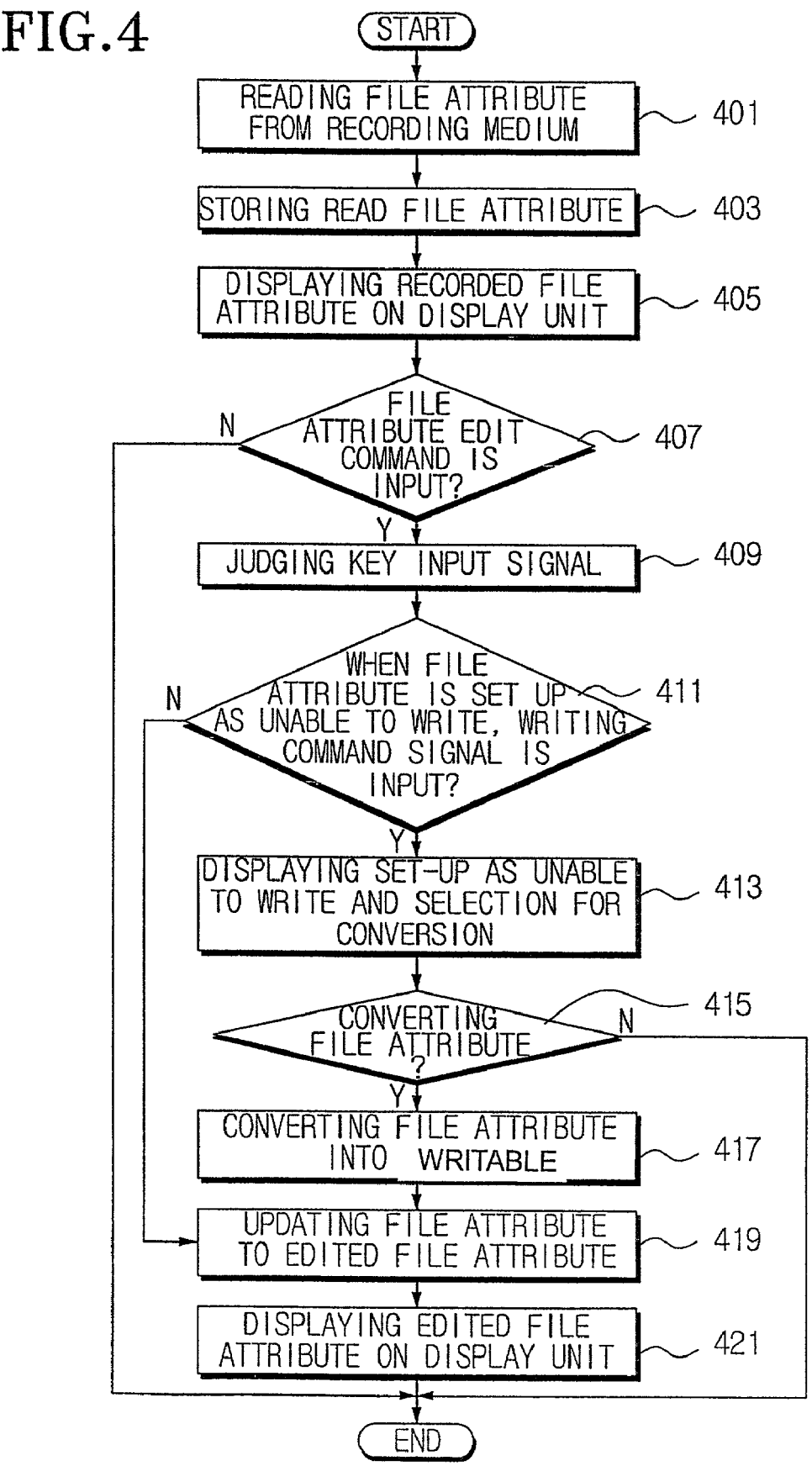
FIG. 4 is a flow chart showing a method of managing a file using the digital device of FIG. 2 for the DCD.

FIG. 4 shows a flow chart illustrating a method of managing a file using the digital device 100 of FIG. 2 for the DCD 10. The operation of the file management apparatus will be described with reference to FIG. 2.

The DSP 141 reads the file attribute information from the DCD 10 inserted into the digital device 100 by driving the engine unit 120. Here, an operation to read the file attribute information from the DCD 10 can be automatically processed by the DSP 141 in response to the insertion of the DCD 10 into the digital device 100, or it can be processed after receiving a command to read the file attribute information from the key input unit 148.

The DSP 141 stores the file attribute information read from the DCD 10 into the memory 143. Moreover, in operation 405, the DSP 141 allows a user to easily edit the file attribute information by displaying the file attribute information read from the DCD 10 on the LCD display 145.

In operation 407, with a display of the file attribute information on the LCD display 145, the DSP 141 judges whether a command to edit the file attribute information is input from the key input unit 148. The command to edit the file attribute information is input by the user through the key input unit 148.

In operation 409, with the command to edit the file attribute information input by the user, the DSP 141 determines the type of the file attribute information to edit by judging the commanded input. In other words, the DSP 141 determines which of the file attributes among the hiding, the writing, the file name changing, file route, and deleting is selected by the command to edit. It is understood that the file attribute is not limited to the above mentioned attributes and can include other file attributes.

In operation 411, when the file attribute information is set up as unable to write and the DSP 141 judges that a key signal to write is input, the DSP 141 displays on the display unit that the file attribute information is set up as unable to write with respect to the selected file, and displays a selection option to convert the file attribute information set up as unable to write, to write, in operation 413.

In operation 415, in response to a command to convert the file attribute information transmitted through the key input unit 148, the DSP 141 converts the file attribute set up as unable to write, to write, in operation 417. Here, the key signal of the command to write includes a command to write, such as "Change the file name," where the file attribute is set up as unable to write, even though the command is not a direct command to write.

In operation 419, the DSP 141 updates the file attribute information, which has been converted to write, to edited file attribute information. Moreover, in operation 421, the DSP 141 allows the user to verify that the file attribute information is updated to new file attribute information by displaying the edited file attribute information on the LCD display 145.

Where a command to convert the file attribute is not transmitted, the DSP 141 finishes the file management method for the portable device without doing any other operations.

Where no input command to edit the file attribute information is received from the key input unit 148, after the file attribute information stored in the memory 143 is displayed on the LCD display 145, the DSP 141 finishes the operation of the file management method. Here, the DSP 141 can display whether the command to edit is input on the LCD display 145.

In response to the transmitted command to edit the file attribute information from the key input unit 148, and the DSP 141 determines that the transmitted key input signal is input where the set-up file attribute information is writable, the DSP 141 updates the set-up file attribute information to edited file attribute information in operation 419. With the set-up file attribute information updated to the edited file attribute, the DSP 141 displays the edited file attribute information on the LCD display 145 in operation 421.

As described above, an apparatus and a method of managing a file according to an embodiment of the present invention allow a user to easily manage a vast amount of information/files.

According to the present invention, the file management apparatus for the portable device manages the data in accordance with the attribute information of the files recorded in the recording medium. In addition, the user can manage his/her own files more easily as he/she can edit the attribute information of the files. While a display unit has been described to display the attribute information to allow a user to easily edit the attribute information, it is understood that an output unit comprising one or a combination of the display unit and a voice synthesizing unit can be used to allow the user to edit the attribute information. In other words, in addition to or instead of a text and/or a graphic message, a voice message can be used to allow the user to easily edit the attribute information of a file.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A file management apparatus of a portable device for recording/reproducing a file into/from a recording medium, comprising:
    a disk engine which reads attribute information of the file recorded in the recording medium;
    a controller which controls the portable device to record/reproduce the file corresponding to the attribute information;
    an input unit having a key which edits the attribute information, wherein the controller updates the attribute information recorded in the recording medium by editing the attribute information of the file in accordance with an input edit command by the input unit;
    a memory which receives and stores the attribute information from the recording medium; and
    a display unit which displays the attribute information stored in the memory to allow a user to edit the attribute information,
    wherein the attribute information stored into the memory includes at least one attribute information among a hiding, writing, file name changing, file route, and deleting with respect to the file,
    wherein the controller displays edited attribute information on the display unit in response to editing by the input unit of at least one of the attribute information among the hiding, writing, file name changing, file route, and deleting stored in the memory, and
    wherein the controller displays a message asking whether to convert the attribute information of the file to writeable attribute information in response to a transmittal of a writing command key signal where the attribute information of the file is set up as unable to write, and processes the file corresponding to a replied signal with respect to converting the attribute information from the input unit.

2. The file management apparatus of a portable device of claim 1, wherein the recording medium comprises a digital convergence disk (DCD).

3. The file management apparatus of a portable device of claim 1, wherein the controller displays edited attribute information on the display unit in response to editing by the input unit of the attribute information read from the recording medium.

4. The file management apparatus of a portable device of claim 1, wherein the recording medium comprises a digital convergence disk (DCD).

5. The file management apparatus of a portable device of claim 1, further comprising layers which connect the disk engine and the controller, and include:
    a physical layer which physically connects the disk engine and the controller,
    a data-link layer which defines a method of exchanging information between the disk engine and the controller,
    a command layer which records commands corresponding to data of the portable device, so as to control the data accessed from the disk engine, and
    an application layer which includes a mapping of file data/meta data and a user interface.

6. A file management apparatus of a portable device for recording/reproducing a file into/from a recording medium, comprising:
    a disk engine which reads attribute information of the file recorded in the recording medium;
    a controller which controls the portable device to record/reproduce the file corresponding to the attribute information;
    an input unit having a key which edits the attribute information, wherein the controller updates the attribute information recorded in the recording medium by editing the attribute information of the file in accordance with an input edit command by the input unit;
    a memory which receives and stores the attribute information from the recording medium; and
    an output unit which outputs the attribute information stored in the memory to allow a user to edit the attribute information, wherein the output unit comprises at least one of a display unit and a voice synthesizing unit,
    wherein the controller:
        outputs edited attribute information to the output unit in response to editing by the input unit of the attribute information read from the recording medium,
        prompts the user for a reply signal whether to convert the attribute information to writeable attribute information in response to a transmittal of a writing commend key signal where the attribute information is set up as non-writeable, and
        processes the file corresponding to the reply signal.

7. The file management apparatus of a portable device of claim 6, wherein the recording medium comprises a digital convergence disk (DCD).

8. A file management apparatus of a portable device for recording/reproducing a file into/from a recording medium, comprising:
    a disk engine which reads attribute information of the file recorded in the recording medium; and
    a controller which controls the portable device to record/reproduce the file corresponding to the attribute information,
    wherein the disk engine comprises a register unit which allows communication between the disk engine and the controller, and
    wherein the register unit comprises a control register, a status register, a byte counter and a data register, wherein the controller selects and accesses one of the control, status, byte and data registers, in accordance with a value of two bits of an address bit, to interface with the portable device.

* * * * *

UNITED STATES PATENT AND TRADEMARK OFFICE
CERTIFICATE OF CORRECTION

PATENT NO. : 7,058,659 B2 Page 1 of 1
APPLICATION NO. : 10/125514
DATED : June 6, 2006
INVENTOR(S) : Ho-yong Ryu It is certified that error appears in the above-identified patent and that said Letters Patent is hereby corrected as shown below:

On Title Page, Item (56) (Other Publications), Line 4, change "J" to --J.--.

Column 8, Line 35, change "commend" to --command--.

Signed and Sealed this

Twenty-eighth Day of November, 2006

JON W. DUDAS
*Director of the United States Patent and Trademark Office*